June 8, 1965 P. G. HOLBOURNE 3,187,557
APPARATUS FOR MEASURING THE CLOUD POINT OF HYDROCARBON OILS
Filed Jan. 30, 1963 3 Sheets-Sheet 1

INVENTOR
PETER GEORGE HOLBOURNE
BY
Morgan, Finnegan, Durham & Pine
ATTORNEYS

June 8, 1965 P. G. HOLBOURNE 3,187,557
APPARATUS FOR MEASURING THE CLOUD POINT OF HYDROCARBON OILS
Filed Jan. 30, 1963 3 Sheets-Sheet 2
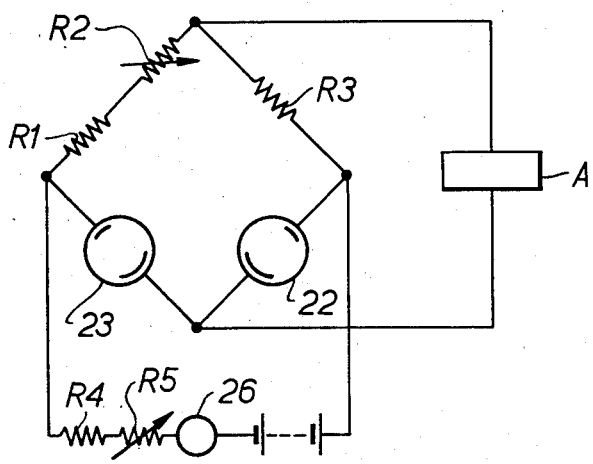
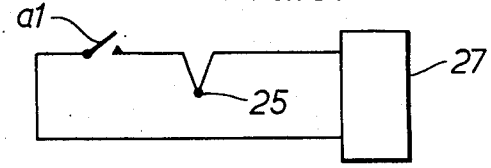
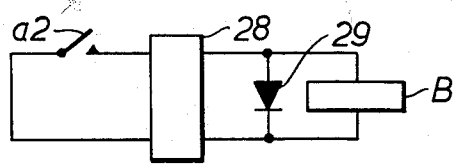
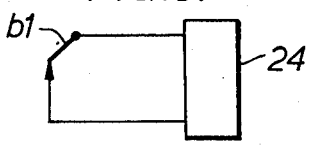
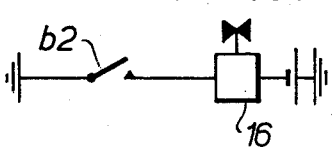
INVENTOR
PETER GEORGE HOLBOURNE
BY
Morgan, Finnegan, Durham & Pine
ATTORNEYS INVENTOR
PETER GEORGE HOLBOURNE
BY
Morgan, Finnegan, Durham & Pine
ATTORNEYS

United States Patent Office 3,187,557
Patented June 8, 1965

3,187,557
APPARATUS FOR MEASURING THE CLOUD POINT OF HYDROCARBON OILS
Peter George Holbourne, Sunbury-on-Thames, Middlesex, England, assignor to The British Petroleum Company Limited, London, England, a British joint-stock corporation
Filed Jan. 30, 1963, Ser. No. 255,024
Claims priority, application Great Britain, Feb. 5, 1962, 4,358/62
11 Claims. (Cl. 73—17)

This invention relates to apparatus for measuring the cloud point or pour point of hydrocarbon oils.

The definition of cloud point, given by the Institute of Petroleum, is "The Temperature, being a multiple of 1° C., at which a cloud or haze appears when the oil is cooled under prescribed conditions." It is believed that the cloud or haze which appears in the oil is caused by paraffin wax or other solid substances crystallising out or separating from the oil when it is cooled.

The definition of pour point, given by the Institute of Petroleum, is "That temperature being a multiple of 3° C. which is 3° C. above the temperature at which the oil just fails to flow when cooled under prescribed conditions." The relationship between the cloud point and pour point is not precise but the pour point is normally about 6° C. lower than the cloud point.

The significance of, and the need for knowing, the cloud point or the pour point of hydrocarbon oils is well established in the oil industry.

At the present time, the cloud point of an oil is measured using cooling baths, and takes approximately one and a half hours. When blending oils for use in low temperature conditions the cloud point must be determined at each step, this being a slow and tedious process.

It is an object of the present invention to provide apparatus for measuring the cloud point or pour point of hydrocarbon oils, which is quicker and less tedious than present apparatus.

According to a further aspect of the invention we provide an apparatus for measuring the cloud point or pour point of hydrocarbon oil, including a measuring cell adapted to contain a sample of the oil and having a reflecting surface, drying means for drying the oil before it enters the measuring cell, temperature measuring means associated with the measuring cell, means for cooling the measuring cell, a light source arranged so as to direct a beam of light, through the oil in the cell, on to the reflecting surface, and a photoelectric cell arranged so as to accept a beam of light, from the reflecting surface, whereby a predetermined decrease in the intensity of the reflected light beam is indicated by the photoelectric cell so that the temperature at which the decrease occurs can be noted.

Preferably the apparatus includes a reference cell adapted to contain a further sample of the oil at ambient temperature, the reference cell having a reflecting surface arranged so as to receive a beam of light from the said light source through the oil contained in the cell, and a further photoelectric cell arranged so as to receive a beam of light from the reflecting surface of the reference cell, whereby the decrease in intensity of the beam of light reflected by the reflecting surface of the measuring cell can be determined by comparing the outputs of the two photoelectric cells.

Conveniently each one of the two photoelectric cells is connected as an arm of a bridge circuit adapted so that when the intensity of the beam of light, reflected from the reflecting surface of the measuring cell, decreases, the bridge circuit becomes out of balance, this condition being arranged to actuate the temperature measuring means, and to cause the cooling means to become inoperative.

Preferably temperature recording means is associated with the temperature measuring means whereby when the latter is actuated a permanent record is made of the temperature measured.

Conveniently the out-of-balance condition of the bridge circuit is adapted to cause an outlet valve to open, to allow the oil in the reference and measuring cells to flow out of these cells, and also operate a timing device which closes the outlet valve after the tested oil has escaped from the cells and another sample of oil has flowed from a common source into the reference and measuring cells, so providing a cloud point or pour point monitoring system.

Preferably the whole apparatus is contained in a vacuum chamber.

Conveniently the cooling means is of the thermo electric type.

Preferably the temperature measuring means is in the form of a thermocouple.

In order that the invention may be more clearly understood a specific embodiment will now be described, by way of example only, with reference to the accompanying drawings in which:

FIGURE 2 shows a bridge circuit for the apparatus of FIG. 1;

FIGURES 3 to 6 show further circuitry for use with the bridge circuit of FIG. 2;

Figure 1:
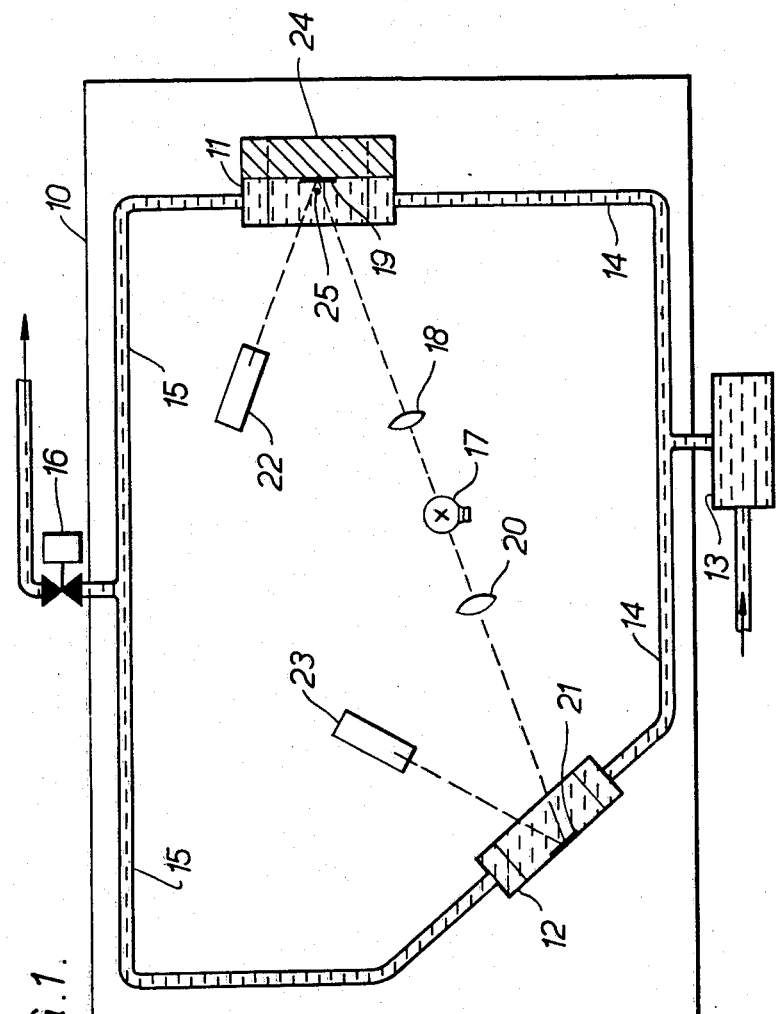
FIGURE 1 shows a diagrammatic representation of a cloud point or pour point measuring apparatus.

Referring firstly to FIGURE 1 there is shown a diagrammatic representation of a cloud point or pour point measuring apparatus contained within an evacuated chamber 10. The apparatus includes a measuring cell 11, and a reference cell 12, both of which can be filled with oil through drying means 13, from a common source, by pipes 14. The oil flows out of the cells through pipes 15, under control of an electromagnetically operated valve 16.

A light source 17 is arranged so that a beam of light is directed through a focussing device 18, on to a reflecting surface 19 of the measuring cell 11, and also a further beam of light, of the same intensity, is directed through a focussing device 20, on to a reflecting surface 21 of the reference cell 12. The arrangement is such that the beams of light pass through windows (not shown) in the cells 11 and 12, and through the same depth of oil in each of those cells. The reflecting surfaces 19 and 21 may be mirrors which are fixed to the inside surfaces of the cells 11 and 12, or alternatively the inside surfaces could be polished so as to constitute the reflecting surfaces.

A photoelectric cell 22 is arranged so as to receive the beam of light from the reflecting surface 19, through the oil and the measuring cell window. Similarly a further photoelectric cell 23 is arranged to receive the beam of light from the reflecting surface 21 through the oil and the reference cell window. The photoelectric cells 22 and 23 are positioned so that the reflected beams of light pass through the same depth of oil in the measuring cell 11 and the reference cell 12. The photoelectric cells 22 and 23 are preferably a matched pair.

The measuring cell 11 is provided with thermo-electric means 24 for cooling the oil in the cell, and a thermocouple 25 for use in measuring the temperature of the oil in the cell.

Referring now to FIGURES 2 to 6, there is shown a Wheatstone bridge circuit (FIG. 2), with the photoelectric cell 22 connected as a first arm; the photoelectric cell 23 connected as a second arm; a resistor R1 and variable resistor R2 connected in series as the third arm; and a resistor R3 connected as the fourth arm. Variable resistor R2 is provided to allow adjustment for balancing the bridge. The electric supply to the bridge is connected from between resistor R1 and photoelectric cell 23, to between resistor R3 and photoelectric cell 22. The electric supply circuit comprises a resistor R4, a variable resistor R5, an ammeter 26, and a battery. The output circuit from the bridge comprises an electromagnetic relay A, one end of its energising coil being connected between resistors R2 and R3, and the other end of its energising coil being connected between photoelectric cells 22 and 23. The variable resistor R5 is provided to allow adjustment of the current supplied to the bridge such that, on the one hand the current rating of the photoelectric cells will not be exceeded, and on the other hand sufficient current will be supplied to energise the relay A when the bridge becomes out of balance due to the cloud point or pour point being reached.

The resistance of the energising coil of relay A is varied (i.e. by fitting a different coil assembly) according to whether the cloud point or the pour point of the oil is to be measured. By varying the resistance of the coil of relay A the amount of out of balance signal required to energise the relay is varied and hence the amount of cloudiness of the oil measured is varied.

Relay A has two make contacts a1 and a2. Contact a1 (FIG. 3), is arranged, upon energisation of relay A, to complete a circuit from the thermocouple 25 to a pen type temperature recorder 27. The contact a1 could be omitted and the thermocouple 25 connected directly to the pen recorder 27, so as to give a continuous graph of the temperature of the oil in measuring cell 11. Contact a2 (FIG. 4), is arranged, upon energisation of relay A, to complete a circuit for the energization of an electromagnetic relay B. A delay circuit 28 is connected in the circuit for energisation of relay B, and is adapted to maintain relay B energised for approximately one minute. Rectifier 29 is also connected across the energising coil of relay B to prevent the wastage of current during energisation; and to provde a low resistance path for the circulating currents on release, so increasing the release lag.

Relay B has one break contact b1, and one make contact b2. Break contact b1 (FIG. 5), is connected, so as to disconect the electric supply from the thermoelectric cooling means 24, when relay B is energised. Make contact b2 (FIG. 6), is arranged to complete a circuit for energising the electromagnetic valve 16 to allow the oil to flow out of the apparatus.

Figure 7:
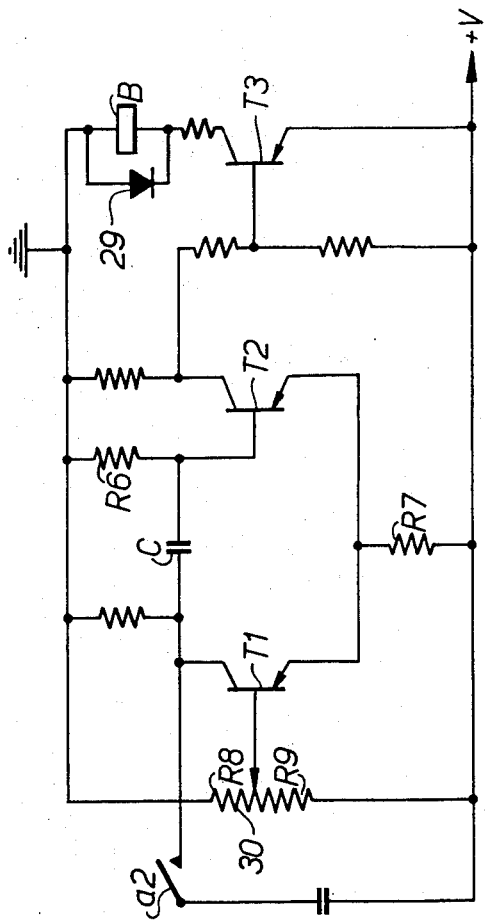
FIGURE 7 shows in detail, the circuit shown in block form in FIG. 4.

Referring now to FIGURE 7 there is shown a detailed circuit of FIGURE 4, in which only components of special significance are referred to. The circuit shown is arranged to maintain relay B operated for a length of time which is dependent upon the value of a resistor R6, and the values of tappings R8 and R9 of a potentiometer 30. With contact a2 open a transistor T2 is arranged to conduct by a biassing current applied to its emitter through a resistor R7. The resistor R7 is also connected to the emitter of a transistor T1 whose base is connected to the tapping connection of potentiometer 30. The values of resistor R7 and tapping R9 are such that the voltage across resistor R7 is greater than the voltage across tapping R9. A capacitor C, connected between the collectors of transistors T1 and T2, is thereby charged to a value equal to the supply voltage +V, minus the voltage across resistor R7. When contact a2 closes, a positive voltage pulse is applied to capacitor C, which tends to discharge it through resistor R6 connected between the base of transistor T2 and earth. This causes transistor T2 to be cut off so allowing transistor T1 to conduct. The collector of transistor T1 thus becomes more positive and tends to further discharge capacitor C, under control of capacitor C and resistor R7. The ratio of the tappings R8 and R9 controls the potential of the base of transistor T2, and the minimum current in resistor R6 which will continue to hold transistor T2 off. The voltage across the collector of transistor T2 and the +V supply line is used to switch a further transistor T3 between its conducting and non-conducting conditions. Relay B is connected in the emitter collector circuit of transistor T3, whereby relay B is operated when transistor T3 conducts. With this circuit relay B can be maintained operated for approximately one minute.

A method of measuring the cloud point or pour point of a sample of hydrocarbon oil, utilising the above apparatus, will now be described. Oil passes into the apparatus via the drying means 13, water contained in the oil should be removed, otherwise when the oil is cooled the water freezes and the ice formed causes the apparatus to detect a false temperature for the cloud point or pour point. With the oil in the apparatus, the variable resistors R2 and R5 are adjusted to balance the bridge, and ensure the correct current flow for out of balance condition. The bridge is adjusted for balance when the beams of light reflected to the photocells 22 and 32 pass through the oil at ambient temperature. The oil in the measuring cell is cooled until the cloud point is reached. When the cloud point is reached the intensity of the beam of light, passing through the measuring cell, is reduced by the solid particles present in the oil. The reduced intensity beam reaching the photoelectric cell 22 varies the resistance of the cell, and so the bridge circuit goes out of balance. The out of balance condition causes current to flow in the output circuit, and relay A is energised. Contact a1 then completes a circuit from the thermocouple to the pen recorder 27, to record the temperature. Contact a2 completes a circuit for relay B to be energised, and maintained energised, by delay circuit 28. Contact b1 breaks the circuit for the cooling means, to stop the oil from being cooled further. Contact b2 completes a circuit to actuate electromagnetic valve 16, to allow the oil to flow out from the apparatus, and a fresh sample to flow in.

Relay B is arranged to remain operated for approximately on minute so that all the tested oil is flushed out by new oil entering the apparatus. The measuring cell 11 has chamfered corners so as to aid in the flow of tested oil from the cell, and to ensure that no wax particles remain in the cell. When the new oil sample has entered the apparatus, the bridge becomes balanced again, and relay A releases, so switching off the pen recorder, and breaking the energising circuit for relay B. After the time delay, determined by delay circuit 28, relay B releases, so switching the cooling means on, and shutting the outlet valve. This cycle now continues automatically to provide a cloud point monitoring system which could be connected to control a blending plant.

A laboratory model of the described apparatus has been built and tested. In the tests, reproducible values were obtained for cloud point, which could be correlated with values obtained by the standard method. The cycle time for measuring the cloud point is approximately one and a half minutes using the apparatus described, whereas the time for measuring cloud point using the standard method is approximately one and a half hours.

I claim:

1. Apparatus for sequentially measuring the cloud point or the pour point of a hydrocarbon oil, comprising a measuring cell adapted to contain a sample of the oil and having a reflecting surface, means for drying the oil before it enters the measuring cell, temperature measuring means associated with the measuring cell for measuring the temperature of the oil in the cell, means for cooling the oil in the measuring cell, a light source arranged so as to direct a beam of light through the oil in the cell on to the reflecting surface, light intensity detecting means for detecting changes in light intensity and for actuating said temperature measuring means in response to a change in light intensity, said light intensity detecting means being arranged so as to accept a beam of light from the reflecting surface, whereby a pre-determined change in the intensity of the light beam causes said light intensity detecting means to actuate the said temperature measuring means, so that the temperature at which the said change occurs can be recorded, outlet valve means associated with said measuring cell, valve-actuating means for causing said outlet valve means to open, said valve-actuating means being actuated by said light intensity detecting means in response to a pre-determined change in the intensity of said light beam, in order that the oil may flow out of the said measuring cell upon actuation of said temperature measuring means, and means for closing the outlet valve means after the tested oil has escaped from the cell and another sample of oil has flowed into the measuring cell.

2. Apparatus as claimed in claim 1 which comprises means of measuring continuously the intensity of the reflected beam of light.

3. Apparatus as claimed in claim 1 which comprises means of directing a further beam of light, with the same inensity as the beam of light directed into the oil sample, through some of the oil, which remains at ambient temperature, on to a further reflecting surface, the decrease of the intensity of the beam of light reflected by the reflecting surface which receives the beam directed through the oil sample being cooled, being measured by comparing the intensities of the two light beams reflected by the said reflecting surfaces.

4. Apparatus as claimed in claim 1 comprising a reference cell adapted to contain a further sample of the oil at ambient temperature, the reference cell having a reflecting surface arranged so as to receive a beam of light from the said light source through the oil contained in the cell, and a further means of detecting changes in light intensity arranged so as to receive a beam of light from the reflecting surface of the reference cell, whereby the decrease in intensity of the beam of light reflected by the reflecting surface of the measuring cell can be determined by comparing the outputs of the two said means of detecting changes in light intensity.

5. Apparatus as claimed in claim 4 wherein each of the two means of detecting changes in light intensity is connected as an arm of a bridge circuit adapted so that when the intensity of the beam of light, reflected from the reflecting surface of the measuring cell, decreases, the bridge circuit becomes out of balance, this condition being arranged to actuate the temperature measuring means, and to cause the cooling means to become inoperative.

6. Apparatus as claimed in claim 5 wherein temperature recording means is associated with the temperature measuring means whereby when the latter is actuated a permanent record is made of the temperature measured.

7. Apparatus as claimed in claim 6 wherein the whole apparatus is contained in a vacuum chamber.

8. Apparatus as claimed in claim 7 wherein the cooling means is of the thermo-electric type.

9. Apparatus as claimed in claim 8 wherein the temperature measuring means is in the form of a thermocouple.

10. Apparatus as claimed in claim 9 wherein the means of detecting changes in light intensity is a photo-electric cell.

11. Apparatus as claimed in claim 10 wherein the means for closing the outlet valve means is a timer device.

References Cited by the Examiner
UNITED STATES PATENTS

| | | | |
|---|---|---|---|
| 2,720,107 | 10/55 | McBriar | 73—17 |
| 2,967,423 | 1/61 | Rhodes | 73—17 |
| 2,979,950 | 4/61 | Leone | 73—17 X |
| 3,008,324 | 11/61 | Rayford et al. | 73—17 |
| 3,077,763 | 2/63 | Gena et al. | 73—17 |

RICHARD C. QUEISSER, *Primary Examiner.*

DAVID SCHONBERG, *Examiner.*